United States Patent [19]

Pope

[11] Patent Number: 4,712,819
[45] Date of Patent: Dec. 15, 1987

[54] TOOL FOR LIFTING DOORS AND PANELS

[76] Inventor: Urban Pope, 168 E. Vista Ave., Daly City, Calif. 94014

[21] Appl. No.: 385,479

[22] Filed: Jun. 7, 1982

[51] Int. Cl.4 .......................... B66F 15/00; B65G 7/12
[52] U.S. Cl. .......................................... 294/92; 294/15
[58] Field of Search .................. 294/92, 15, 1 R, 17, 294/19 R, 67 R, 67 A, 67 AA, 67 AB, 67 B; 269/127

[56] References Cited

U.S. PATENT DOCUMENTS 1,401,046 12/1921 Clymer .................................. 294/15
1,448,999 3/1923 Haarberg ............................... 294/15
3,363,927 1/1968 Wesemann ............................ 294/92
3,642,251 2/1972 Guenther .............................. 294/15

Primary Examiner—James B. Marbert
Attorney, Agent, or Firm—Flehr, Hohbach, Test, Albritton & Herbert

[57] ABSTRACT

Tool for lifting doors, panels and the like to facilitate installation and handling of the same. The tool comprises a pair of fingers affixed to a horizontally extending arm for gripping opposite sides of the door, panel or other member when a lifting force is applied to a handle connected to the outer end of the arm.

5 Claims, 3 Drawing Figures

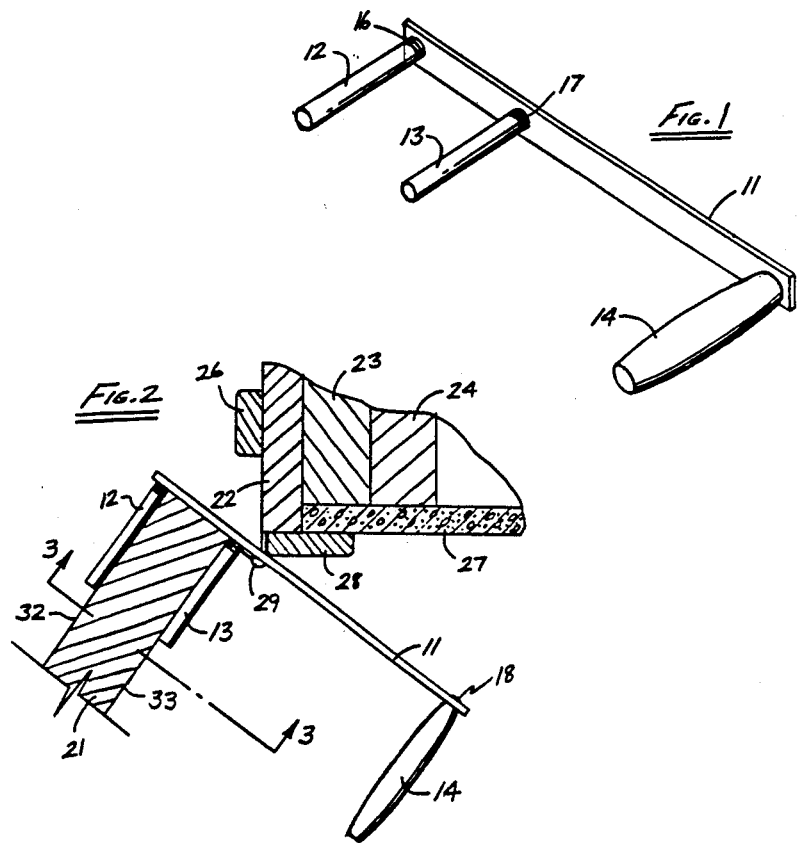
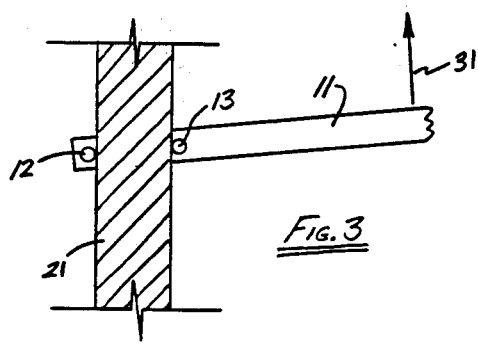

TOOL FOR LIFTING DOORS AND PANELS

This invention pertains generally to tools for use in the installation and handling of doors and panels, and more particularly to a tool for lifting doors and panels in an upright position to facilitate installation and handling of the same.

In hanging a door, once the hinge parts have been mounted on the door jamb and on the side edge of the door, the door is lifted into position to mate the hinge parts, and if separate hinge pins are used, they are inserted. During this process, the door is typically gripped by its side edge portions and lifted manually into position. Lifting the door in this manner is somewhat cumbersome, particularly on the side where the hinges are located, because there usually is not enough room for a hand between that hinge of the door and the door jamb when the hinge parts are brought together.

U.S. Pat. No. 3,642,251 describes a rather complex door jack which is inserted between the lower edge of the door and the floor, and functions somewhat as a pry bar to hold the door in position while it is being hung.

It is in general an object of the invention to provide a new and improved hand tool for lifting generally planar members such as door and panels in an upright position to facilitate the installation and handling thereof.

Another object of the invention is to provide a tool of the above character which is economical and easy to use.

These and other objects are achieved in accordance with the invention by providing a tool having an elongated arm, with a handle portion and a pair of generally parallel fingers extending from the arm for engagement with opposite sides of the door or other generally planar member to be lifted. The fingers are spaced apart by a distance slightly greater than the thickness of the door, and they are brought into gripping engagement with the surfaces of the door upon application of a lifting force to the handle portion of the tool.

FIG. 1 is an isometric view of one embodiment of a tool for lifting doors and panels in accordance with the invention.

FIG. 2 is a horizontal sectional view illustrating the use of the embodiment of FIG. 1 in hanging a door in a wood frame structure.

FIG. 3 is a fragmentary cross-sectional view taken along line 3—3 in FIG. 2.

As illustrated in the drawings, the tool comprises an elongated arm 11 with a pair of jaws or fingers 12, 13 extending therefrom in spaced parallel relation. The fingers are generally perpendicular to the arm, and they are spaced apart by a distance slightly greater than the thickness of the door or other planar member to be lifted. A handle 14 extends from arm 11 toward the opposite end of the arm from fingers 12, 13 and in a direction generally parallel to the fingers.

In the embodiment illustrated, arm 11 comprises a relatively flat metal bar of rectangular cross-section, although any other suitable material and shape can be employed. This particular bar has a thickness on the order of ⅛" and a width on the order of 1". Fingers 12, 13 are likewise fabricated of metal or another suitable rigid material, and they are provided with a smooth outer contour so that they will not mar the surfaces of the door or other member which they engage.

In the embodiment illustrated, fingers 12, 13 are metal pins of circular cross-section, and they are threadedly affixed to arm 11. For this purpose, threads 16 are formed at the inner ends of the fingers, and threaded bores 17 are formed in arm 11. Thus, the fingers are rigidly, yet removably, affixed to the arm.

Handle 14 can be fabricated of any suitable material such as wood, metal or plastic, and is affixed to arm 11 by a pin 18.

In FIGS. 2-3, the tool is illustrated in connection with the hanging of a door 21 in a door frame structure of conventional design. This structure comprises a side jamb 22, studs 23, 24 and a door stop 26. Wall board 27 is affixed to the studs, and a decorative case molding 28 covers the joint between the door jamb and the wall board. Hinge parts 29 are mounted on the door jamb and the side edge of the door in the conventional manner.

Operation and use of the tool in lifting the door is as follows. The tool is placed on the side edge of the door where the hinges are located, with fingers 12, 13 on opposite sides of the door, and arm 11 extending in a generally horizontal direction from the side of the door which faces into the room from which the door is hung. The door is lifted by grasping handle 14 with one hand and holding the other side edge of the door with the other hand. The application of an upwardly directed force to the handle, as indicated by arrow 31 in FIG. 3, brings fingers 12, 13 into gripping engagement with surfaces 32, 33 on the opposite sides of the door.

When the door has been lifted to the desired position and installed, e.g., by insertion of the hinge pins, the tool can be disengaged from the door simply by releasing handle 14, removing finger 12, and withdrawing the tool from the door. Alternatively, if the space between the door and the jamb is sufficient, the tool can be rotated through an angle of 90° about the axis of arm 11 and withdrawn without removing the fingers from the arm.

While the invention has been described with specific references to an embodiment having a relatively flat arm with removable fingers, the elements of the tool can be of any suitable shape or construction. For example, arm 11 can be fabricated of round bar stock, finger 12 and handle 14 can be formed by bending the ends of the bar stock, and finger 13 can be affixed to arm 11 by welding.

It is apparent from the foregoing that a new and improved tool for lifting doors, panels and other generally planar members has been provided. While only one presently preferred embodiment has been described in detail, as will be apparent to those familiar with the art, certain changes and modifications can be made without departing from the scope of the invention as defined by the following claims.

What is claimed is:

1. A tool for setting a door in a jamb, comprising an elongated arm comprising a flat bar of generally rectangular cross-section positioned between one side edge of the door and the jamb and having a handle portion which projects outwardly on one side of the door, said elongated arm being of sufficiently narrow width to move freely between the door and the jamb when the door is installed in the jamb, and a pair of generally parallel fingers extending from the arm on opposite sides of the door for gripping engagement with the door when the handle is lifted in a vertical direction, one of said fingers being threadedly attached to the bar and removable from the arm to permit withdrawal of the arm from between the door and the jamb when the door is installed.

2. A tool for setting a door in a jamb, comprising an elongated arm positioned between one side edge of the door and the jamb and having a handle portion which projects outwardly on one side of the door, said elongated arm being of sufficiently narrow width to move freely between the door and the jamb when the door is installed in the jamb, and a pair of generally parallel fingers extending from the arm on opposite sides of the door for gripping engagement with the door when the handle is lifted in a vertical direction, said handle portion extending in a direction generally parallel to the fingers and being spaced outwardly from the surface of the door, one of said fingers being removable from the arm to permit withdrawal of the arm from between the door and the jamb when the door is installed.

3. A tool for setting a door in a jamb, comprising an elongated arm of sufficiently narrow width to move freely between the door and the jamb when the door is installed in the jamb, a handle portion toward one end of the arm, and a pair of generally parallel fingers extending from the arm and being spaced apart by a distance slightly greater than the thicknss of the door for gripping engagement with the door when the handle portion is lifted in a vertical direction, the one of said fingers spaced further from the handle portion being removable from the arm to permit withdrawal of the tool from between the door and the jamb when the door has been installed.

4. The tool of claim 3 wherein the elongated arm comprises a flat bar of generally rectangular cross-section, and the fingers are threadedly attached to the bar.

5. In a method of setting a door in a jamb utilizing a tool having an elongated arm, a handle portion toward one end of the arm, and a pair of generally parallel fingers extending from the arm toward the other end thereof, the steps of: positioning the tool on one side edge of the door with the arm extending in a generally horizontal direction and the fingers positioned on opposite sides of the door, lifting the handle portion in a generally vertical direction to bring the fingers into gripping engagement with the opposite sides of the door and thereby lift the door, positioning the door in the jamb utilizing the tool to hold the side of the door where the hinges are located, engaging the hinges so that the door is pivotally mounted in the jamb, removing the finger from the arm on the side of the door opposite the handle portion after the door has been installed, and thereafter withdrawing the tool from between the door and the jamb.

* * * * *